United States Patent
Perl

[11] 3,720,918
[45] March 13, 1973

[54] VEHICLE INDICATOR BELT

[76] Inventor: Sidney Perl, 13510 Hart Street, Van Nuys, Calif. 91405

[22] Filed: Aug. 12, 1971

[21] Appl. No.: 171,125

[52] U.S. Cl. .................340/81 R, 240/59, 340/107, 340/134, 340/321
[51] Int. Cl. ................................................B62j 5/00
[58] Field of Search ..................340/134, 321; 240/59

[56] References Cited

UNITED STATES PATENTS

| | | | |
|---|---|---|---|
| 1,662,668 | 3/1928 | Gossett | 240/59 |
| 2,640,980 | 6/1953 | Prupis | 340/321 |
| 3,134,548 | 5/1964 | Medina et al | 240/59 |
| 3,656,105 | 4/1972 | Steltzer et al | 340/119 |

FOREIGN PATENTS OR APPLICATIONS

| | | | |
|---|---|---|---|
| 1,522,294 | 3/1968 | France | 340/134 |
| 948,872 | 2/1949 | France | 340/112 |
| 1,051,129 | 9/1953 | France | 340/134 |

*Primary Examiner*—John W. Caldwell
*Assistant Examiner*—Kenneth N. Leimer
*Attorney*—Harvey S. Hertz

[57] ABSTRACT

A vehicle indicator belt to be worn by a vehicle operator. The belt contains indicator lights which are positioned on the belt. A power supply is also positioned on the belt. Electrical wiring is used to interconnect the indicator lights to the power supply through an activating switch. Further, the belt may contain a channel formed by the belt material for use as a housing for the electrical wiring.

4 Claims, 7 Drawing Figures

PATENTED MAR 13 1973

3,720,918

VEHICLE INDICATOR BELT

The invention relates in general to vehicle indicator belts, and, more particularly, to a self-contained warning indicator to be worn by a vehicle operator.

BACKGROUND OF THE INVENTION

While vehicle safety codes have required the installation of flashing indicators on all automobiles used on public highways, such laws have typically not been extended to cover two-wheeled vehicles such as bicycles or motorcycles. Thus, it is necessary for operators of such vehicles to either have indicators installed on the vehicle at a great expense or to use hand signals in order to indicate a turning maneuver. Hand signals, however, result in an unbalancing of the vehicle and cannot be performed for long periods of time, except by skillful operators. Thus, it has been found that accidents have occurred where the operator of the two-wheeled vehicle has failed to warn the drivers of other vehicles that a turn or lane change is about to occur. Moreover, in other instances the vehicle operator has been found to have lost his balance in attempting to signal other drivers by use of a hand signal.

In order to overcome the attendant disadvantages of the lack of signal indicators on two-wheeled vehicles, the present invention provides a portable vehicle indicator which can be worn by a two-wheeled vehicle operator to indicate to drivers of other vehicles that the operator intends to perform a manuever. Typically, such an indicator is made in the form of a belt which is worn around the waist or chest of the driver. The indicator belt contains its own power supply and is much more economical than the installation of an indicator device on the vehicle. Moreover, since the device is worn by the operator, it is more easily visible than if mounted directly on the vehicle.

SUMMARY OF THE INVENTION

The invention comprises a vehicle indicator belt to be worn by a vehicle operator. The belt is of generally elongated shape and contains means for securing the ends of the belt together. Typically Velcro or a buckle may be used. Indicator lights are positioned on the belt which may be used as warning or signaling means to indicate the vehicle is about to execute a turn or manuever. A power supply is secured to the belt with electrical wiring interconnecting the indicator lights to the power supply. Moreover, switching means are provided for activating and deactivating the indicator lights to the power supply. The belt may be formed with a first section and a second section stitched together and defining a channel therebetween. Normally, the electrical wiring is positioned in the channel. A carrying case which is used for holding a conventional D.C. battery used as the power supply is provided on the belt. The carrying case may be stitched as well as riveted to the belt. The indicator lights may be positioned on a mounted plate which in turn may be secured to the belt by rivets.

The advantages of this invention, both as to its construction and mode of operation will be readily appreciated as the same become better understood by reference to the following detailed description when considered in connection with the accompanying drawings, in which like referenced numerals designate like parts throughout the figures.

DESCRIPTION OF THE PREFERRED EMBODIMENT

Figure 1:
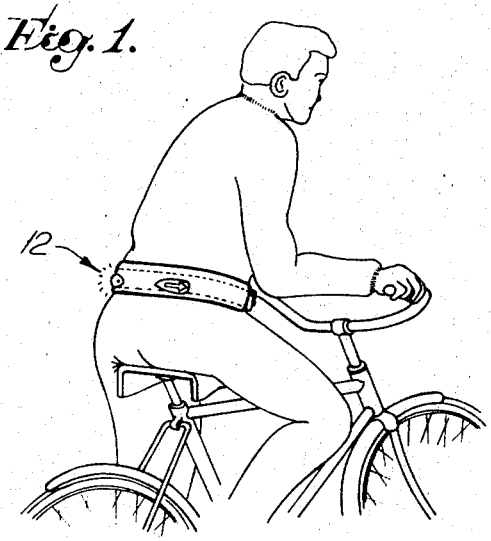
FIG. 1 depicts the vehicle indicator belt being worn by a bicycle operator.
Figure 2:
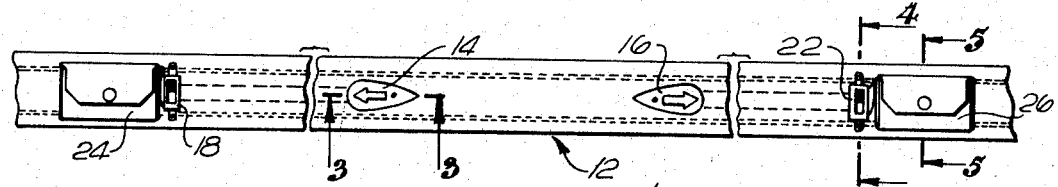
FIG. 2 illustrates a plan view of the belt depicted in FIG. 1.

Referring now to the drawings, there is shown in FIG. 1, a belt 12 worn by the operator of the bicycle. The belt, shown in greater detail in FIG. 2, contains a pair of indicator lights 14, 16 each having a switch 18, 22, and a power supply such as a battery mounted in a battery case 24, 26, respectively associated therewith.

Figure 5:
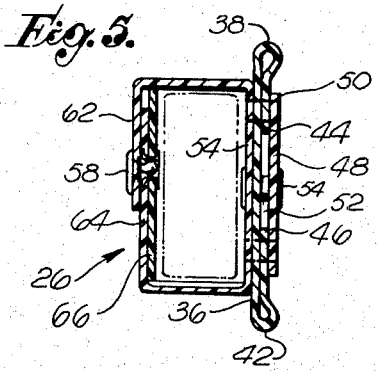
FIG. 5 illustrates a sectional view of the belt taken along the 5—5 of FIG. 2.
Figure 6:
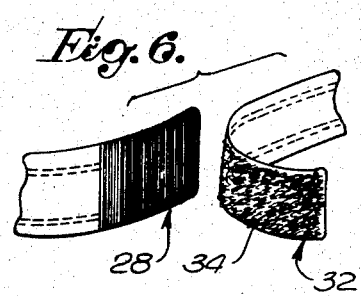
FIG. 6 shows a typical coupling arrangement for the belt of FIG. 1–5.

The construction of the belt is illustrated in greater detail in FIGS. 3–6. The belt itself may be formed of leather or a plastic material. Typically, the belt is worn around the waist of the vehicle operator as shown in FIG. 1 and the two ends thereof 28, 32 secured together. As shown in FIG. 6, the ends of the belt may contain Velcro material 34. Alternatively, of course, a conventional buckle may be used to secure the belt to the operator.

The belt 12 is depicted in FIG. 5 as being made of two-piece construction. The outer portion 36 of the belt is looped at its outer edges 38, 42 which terminate at spaced apart ends 44, 46. The inner portion 48 of the belt is formed of a generally rectangular length of material whose width is greater than the distances between the ends 44, 46. The inner portion 48, is then stitched to the outer portion 36 adjacent to the ends 44, 46 respectively, as at 50 with the resultant generally rectangular shaped channel 52 between formed by the adjacent surface of the portion 36 and 48 and spaced apart ends 44, 46.

The battery cases 24 and 26 are normally made of the same material as the belt and are typically secured to the belt by stitching the portion of the case material 54 adjacent to the belt portion 36 to the belt. This stitching may be made integral with the stitching 50 of the belt. In addition, a rivet 54 may extend through the material 54, as well as the belt portion 36 and 48 to further secure the battery case to the belt. Further, a snap 58 is used to secure the outer cover 62 of the case to its inner sheaths 64 and 66, thus allowing for easy replacement of the batteries.

Figure 3:
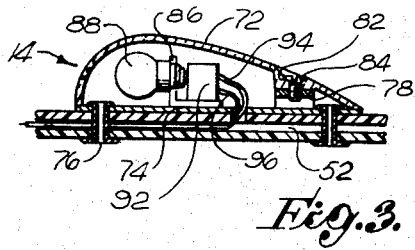
FIG. 3 shows a view of the belt partly in section, taken along the line 3—3 of FIG. 2.

The indicator lights 14 and 16 are shown in greater detail in FIG. 3 and each contain a plastic lens cover 72 which is positioned on a mounting plate 74. The plate 74 is secured to the belt 12 by means of rivets 76. An outwardly extending flange member 78 is formed integrally with the plate 76. The lens cover 72 contains a depressed portion 82 having an opening therein which is axially aligned with an opening in the flange member 78. A screw 84 is threadably secured in these openings which allows the lens cover to be easily removed.

Mounted on the plate 74 is an angle bracket 86 for supporting a light bulb 88 within the indicator lights. The light bulb is electrically connected to a circuit interrupting device 92 which may be of conventional type such as a thermally activated member. A pair of wires 94, 96 are coupled from the circuit interrupting device through openings in the plate 74 to the channel 52 formed in the belt.

Figure 4:
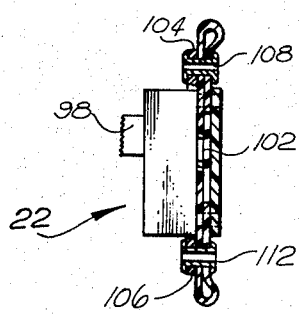
FIG. 4 depicts a view of the belt, partly in section, taken along the line of 4—4 of FIG. 2.

The wires 94, 96 are used to interconnect the indicator lights 14, 16 to its respective switch 18, 22 associated therewith. The switch 22 shown in FIG. 4 is of the conventional single-pole design and contains an actuating member 98. The wires extend through an opening 102 in the belt and are coupled to the switch. The switch contains a pair of flanges 104, 106 at its ends and a pair of rivets 108,112 which pass through the flanges respectively, and the belt, and are used to secure the switch to the belt.

Figure 7:
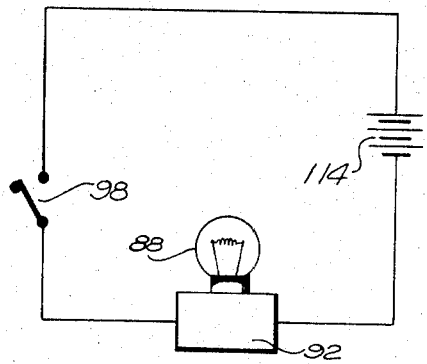
FIG. 7 depicts a circuit diagram of the electrical circuit incorporated in the belt.

A circuit diagram for activating the indicator lights is shown in FIG. 7. Closure of the switch activating member 98 causes a source of voltage such as a battery 114 to be connected to the light bulb 88 through the circuit interrupting device 92. The device 92 causes the light bulb to alternately flash on and off and provide the desired turn indication.

It should be understood, of course, that a single battery could be used to operate the indicator lights 14, 16 with the use of the single pole double throw switch. However, by providing separate switches and power supplies for each of the indicator lights, it should be understood that simultaneous operation of both lights could be provided where emergency warnings are desired.

Moreover, it should be understood that permanently illuminated lights could also be provided in addition to the flashing indicator lights to provide the necessary warning normally provided on bicycles by reflector materials. In addition, additional lights could be provided on the front of the belt to provide a turn indicator to vehicles moving in the direction opposite to directional movement of the wearer of the belt.

I claim:

1. A vehicle indicator belt to be worn on a vehicle operator's body comprising:

a belt portion of generally elongated shape having means for securing the ends of said belt together to position said belt around the vehicle operator's body;

a plurality of spaced apart directional indicator light units positioned on said belt, each unit containing a lamp and flasher means;

power supply means secured to said belt;

respective switching means mounted on said belt at the front of said operator's body for selectively actuating the corresponding directional indicator light units for providing an indication of a change in movement of said vehicle;

electrical wiring interconnecting each said indicator light unit to said power supply means through its corresponding switching means;

a channel formed of a first portion of said belt having a cross-section formed of a first layer of material whose edges overlap said first layer, said edges being spaced from each other and a second portion of material forming a second layer and having a width greater than the distance between said overlapped edges, the part of the said belt containing said edges being spaced between said first and second layers, with said channel being defined by said layers and said edges; and openings formed in said belt material between said channel and the outer surface of said belt, said indicator light units and said switching means being positioned over said openings in said belt material, and wherein the portion of the electrical wiring connected between said light units and the corresponding switching means extends through said openings and along said channel.

2. An indicator belt in accordance with claim 1 wherein a separate power supply source is mounted on said belt for use with each of said directional indicator light units.

3. An indicator belt in accordance with claim 1 wherein each of said indicator light unit is formed with a removable lens cover having a directional arrow thereon.

4. An indicator belt in accordance with claim 1 wherein each of said indicator light units is fixed to a mounting plate, said mounting plate being riveted to said belt and a removable lens positioned on said mounting plate.

* * * * *